(12) United States Patent
Lee et al.

(10) Patent No.: US 9,403,980 B2
(45) Date of Patent: Aug. 2, 2016

(54) POLYAMIDE COMPOSITION HAVING SURFACE REFLECTANCE AND HEAT RESISTANCE

(71) Applicant: Cheil Industries Inc., Gumi-si (KR)

(72) Inventors: Sang Hwa Lee, Uiwang-si (KR); Jong Cheol Lim, Uiwang-si (KR); In Sik Sim, Uiwang-si (KR); Pil Ho Kim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 55 days.

(21) Appl. No.: 13/852,118

(22) Filed: Mar. 28, 2013

(65) Prior Publication Data

US 2013/0217813 A1 Aug. 22, 2013

Related U.S. Application Data

(63) Continuation-in-part of application No. PCT/KR2010/009381, filed on Dec. 28, 2010.

(30) Foreign Application Priority Data

Sep. 28, 2010 (KR) .................. 10-2010-0093676

(51) Int. Cl.
*C08L 77/00* (2006.01)
*C08K 7/14* (2006.01)
*C08K 13/04* (2006.01)
*C08L 77/06* (2006.01)
*C08K 3/22* (2006.01)

(52) U.S. Cl.
CPC . *C08L 77/00* (2013.01); *C08K 7/14* (2013.01); *C08K 13/04* (2013.01); *C08L 77/06* (2013.01); *C08K 2003/2241* (2013.01); *C08K 2201/004* (2013.01); *C08K 2201/016* (2013.01)

(58) Field of Classification Search
CPC ........... C08L 77/00; C08L 77/06; C08K 7/14; C08K 13/04; C08K 2003/2241; C08K 2201/004; C08K 2201/016
USPC ......... 524/409, 417, 420, 423, 424, 425, 427, 524/432, 433, 447, 449, 451, 494
See application file for complete search history.

(56) References Cited

U.S. PATENT DOCUMENTS 7,009,029 B2 3/2006 Oka et al.
2007/0161741 A1 7/2007 Ogasawara

FOREIGN PATENT DOCUMENTS

| JP | 1995-228776 A | 8/1995 |
|---|---|---|
| JP | 2001-115015 A | 4/2001 |
| JP | 2002-294070 A | 10/2002 |
| JP | 2006-257314 A | 9/2006 |
| KR | 10-2006-0135649 A | 12/2006 |
| KR | 10-0926927 B1 | 11/2009 |
| WO | 03/085029 A1 | 10/2003 |
| WO | 2012/043936 A1 | 4/2012 |

OTHER PUBLICATIONS

International Search Report in counterpart International Application No. PCT/KR2010/009381 dated Oct. 24, 2011, pp. 1-4.

*Primary Examiner* — Ana Woodward
(74) *Attorney, Agent, or Firm* — Additon, Higgins & Pendleton, P.A.

(57) ABSTRACT

A polyamide resin composition includes (A) a polyamide resin in an amount of about 30 to about 80% by weight, (B) inorganic filler in an amount of about 10 to about 60% by weight, (C) white pigment in an amount of about 5 to about 50% by weight; and (D) photostabilizer in an amount of about 0.05 to about 2 parts by weight and (E) inorganic fine particles in an amount of about 0.05 to about 3 parts by weight, wherein each of (D) and (E) is based on about 100 parts by weight of the polyamide resin (A). The polyamide resin composition can have good light reflectance and yellowing resistance.

9 Claims, No Drawings

US 9,403,980 B2

POLYAMIDE COMPOSITION HAVING SURFACE REFLECTANCE AND HEAT RESISTANCE

CROSS-REFERENCE TO RELATED APPLICATIONS

This application is a continuation-in-part of International Application No. PCT/KR2010/009381, filed Dec. 28, 2010, pending, which designates the U.S., published as WO 2012/043936, and is incorporated herein by reference in its entirety, and claims priority therefrom under 35 USC Section 120. This application also claims priority under 35 USC Section 119 from Korean Patent Application No. 10-2010-0093676, filed Sep. 28, 2010, the entire disclosure of which is also incorporated herein by reference.

FIELD OF THE INVENTION

The present invention relates to a polyamide resin composition that can have excellent surface reflectance (reflectivity) and heat resistance.

BACKGROUND OF THE INVENTION

A reflecting plate is used in a variety of fields to utilize light effectively. Presently, there is an increased interest in new miniaturized light sources such as semiconductor lasers and light emitting diodes (hereinafter, referred as LEDs).

Materials used to make reflecting plates in LEDs should have good mechanical strength and also good heat resistance with accuracy while loading on a printed wiring board (PCB). In addition, the reflecting plate is required to have a high and stable rate of reflectance (reflectivity). In particular, there is a need to minimize the rate at which reflectance (reflectivity) is reduced, which may occur due to heating during LED assembly and during the reflow soldering process. In addition, a special insert forming process can be used to make a reflecting plate with a high rate of reflectance (reflectivity), which requires a resin composition that can be used in this manufacturing process.

In this field, a material is particularly required which can withstand reflow soldering at 260° C., during which a lead-free solder is used. For that purpose, liquid crystal polymers (LCPs) or heat resistant polyamide resins have been used. LCPs can have excellent heat resistance, light resistance, and rate of flow during molding. However, LCPs can have poor adhesion with the sealing resin, such as epoxy resin, which is used during sealing with resin after installing a light emitting diode on the reflecting plate. Moreover, the LCP may not provide sufficiently high reflectance (reflectivity) as a reflecting plate, because the whiteness of the resin is low.

Aliphatic polyamides (such as PA6, PA66, PA11, and PA12) can have excellent strength and injection molding formability. Such polyamides, however, do not have heat resistance sufficient to withstand high temperatures during the reflow soldering process. In addition, these polyamides can have a low rate of absorption and thus the reflectance (reflectivity) can be reduced since its color changes during heating.

International Publication No. WO 2003-085029 and Japanese Patent No. 1995-228776 are directed to a polyamide resin for a reflecting plate of a light emitting diode. The composition is made by mixing inorganic fillers with polyamide resin comprising 1,9-diaminononane as a diamine. However, in these polyamide resins may not sufficiently prevent decreased reflectivity resulting from heat in the LED assembly and reflow soldering process. Also the composition may not exhibit good adhesive property with the sealing resin.

Japanese Patent No. 2002-294070 is directed to a polyamide resin to which potassium titanate fiber and/or wollastonite are added. However, the polyamide resin composition may not exhibit sufficient strength during a molding process and thus there can be problems using the same in insert molding.

Japanese Patent No. 2001-115015 is directed to a polyamide resin which can reduce discoloration in the molded product by using a specific photostabilizer. However, in this method, since some portion of the resin is attached to the mold during the molding process, the productivity can be affected.

SUMMARY OF THE INVENTION

The present invention provides a polyamide resin composition that can have excellent heat resistance, surface reflectance (reflectivity), mechanical strength and/or processability. The present invention also provides a molded product that can have good surface reflectance (reflectivity) and heat resistance According to one exemplary embodiment, the polyamide resin composition comprises (A) a polyamide resin in an amount of about 30 to about 80% by weight, (B) an inorganic filler in an amount of about 10 to about 60% by weight, (C) a white pigment in an amount of about 5 to about 50% by weight, (D) photostabilizer in an amount of about 0.05 to about 2 parts by weight and (E) inorganic fine particles in an amount of about 0.05 to about 3 parts by weight, wherein (D) and (E) are based on about 100 parts by weight of the polyamide resin (A).

DETAILED DESCRIPTION OF THE INVENTION

The present invention now will be described more fully hereinafter in the following detailed description of the invention in which some but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Polyamide Resin

The polyamide resin (A) in accordance with the present invention comprises dicarboxylic acid component (a-1) and diamine component (a-2).

(a-1) Dicarboxylic Acid Component Unit

The dicarboxylic acid component unit (a-1) of the polyamide resin (A) can include a terephthalic acid component unit in an amount of about 30 to about 100 mol %, an aromatic dicarboxylic acid component other than the terephthalic acid unit in an amount of about 0 to about 70 mol % and/or an aliphatic dicarboxylic acid component unit in an amount of about 0 to about 70 mol %, wherein the amount of each is based on the total mol % (100 mol %) of the dicarboxylic acid component unit (a-1) of the polyamide resin (A).

In some embodiments, the dicarboxylic acid component unit (a-1) of the polyamide resin (A) can include a repeating unit derived from terephthalic acid in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol %. Further, according to some embodiments of the present invention, the amount of the repeating unit derived from terephthalic acid can be in a range from about any of the foregoing amounts to about any other of the foregoing amounts.

In some embodiments, the dicarboxylic acid component unit (a-1) of the polyamide resin (A) can include a repeating unit derived from an aromatic dicarboxylic acid component other than terephthalic acid in an amount of 0 (a repeating unit derived from an aromatic dicarboxylic acid component other than terephthalic acid is not present), about 0 (a repeating unit derived from an aromatic dicarboxylic acid component other than terephthalic acid is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 mol %. Further, according to some embodiments of the present invention, the amount of the repeating unit derived from an aromatic dicarboxylic acid component other than terephthalic acid can be in a range from about any of the foregoing amounts to about any other of the foregoing amounts.

In some embodiments, the dicarboxylic acid component unit (a-1) of the polyamide resin (A) can include a repeating unit derived from an aliphatic dicarboxylic acid in an amount of 0 (a repeating unit derived from an aliphatic dicarboxylic acid is not present), about 0 (a repeating unit derived from an aliphatic dicarboxylic acid is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 mol %. Further, according to some embodiments of the present invention, the amount of the repeating unit derived from an aliphatic dicarboxylic acid can be in a range from about any of the foregoing amounts to about any other of the foregoing amounts.

Examples of the aromatic dicarboxylic acid component unit other than terephthalic acid include without limitation isophthalic acid, 2-methyl terephthalic acid, naphthalene dicarboxylic acid, and the like, and combinations thereof.

The aliphatic dicarboxylic acid component unit is not limited with respect to the number of carbon atoms. In exemplary embodiments, the number of carbon atoms of the aliphatic dicarboxylic acid component unit can range from 4 to 20 carbon atoms, for example 6 to 12 carbon atoms (also referred to herein as C4 to C20 and C6 to C12, respectively).

Examples of aliphatic dicarboxylic acid components used to include these aliphatic dicarboxylic acid component units include without limitation adipic acid, suberic acid, azelaic acid, sebacic acid, decane dicarboxylic acid, undecane dicarboxylic acid, dodecane dicarboxylic acid, and the like, and combinations thereof. In exemplary embodiments, adipic acid can be used.

In exemplary embodiments, when the dicarboxylic acid component unit is 100 mol %, the dicarboxylic acid component unit (a-1) can include the terephthalic acid in an amount of about 30 to about 100 mol %, for example about 40 to about 100 mol %, and as another example about 40 to about 80 mol %; aromatic dicarboxylic acid component unit other than terephthalic acid in an amount of about 0 to about 70 mol %, for example about 0 to about 60 mol %, and as another example about 20 to about 60 mol %; and/or C4-C20 aliphatic dicarboxylic acid component unit, for example C6 to C12 aliphatic dicarboxylic acid component unit, in an amount of about 0 to about 70 mol %, for example about 0 to about 60 mol %, and as another example about 20 to about 60 mol %.

In addition, in accordance with the present invention, the dicarboxylic acid component unit (a-1) can include a higher valent (greater than divalent) carboxylic acid in an amount of less than about 10 mol %, based on the total mol % (100 mol %) of dicarboxylic acid component unit (a-1) of the polyamide resin (A). In some embodiments, the dicarboxylic acid component unit (a-1) of the polyamide resin (A) can include a repeating unit derived from a higher valent carboxylic acid in an amount of 0 (a repeating unit derived from a higher valent carboxylic acid is not present), about 0 (a repeating unit derived from a higher valent carboxylic acid is present), 1, 2, 3, 4, 5, 6, 7, 8, 9, or 10 mol %. Further, according to some embodiments of the present invention, the amount of the repeating unit derived from a higher valent carboxylic acid can be in a range from about any of the foregoing amounts to about any other of the foregoing amounts.

Examples of higher valent dicarboxylic acids includes without limitation tribasic acids such as trimellitic acid, pyromellitic acid and the like, and polybasic acids such as a polyhydric carboxylic acid component unit, as well as combinations thereof.

(a-2) Diamine Component Unit

The diamine component unit (a-2) of the polyamide resin (A) in accordance with the present invention has a linear chain and/or branched chain aliphatic diamine unit having carbon atoms from 4 to 20 (also referred to herein as C4 to C20), for example 6 to 12 carbon atoms (C6 to C12). Examples of linear chain aliphatic diamine component units include without limitation 1,4-diamino butane, 1,6-diamino hexane, 1,7-diamino heptane, 1,8-diamino octane, 1,9-diamino nonane, 1,10-diamino hexane, 1,11-diamino undecane, 1,12-diamino dodecane, and the like, and combinations thereof. In exemplary embodiments, among these, 1,6-diamino hexane in amount of about 50 to 100 mol % can be used.

In exemplary embodiments, the linear chain aliphatic diamine component unit can include a repeating unit derived from 1,6-diamino hexane in an amount of about 50 to about 100 mol % based on the total (100 mol %) of linear chain aliphatic diamine component unit. In some embodiments, the linear chain aliphatic diamine component unit can include a repeating unit derived from 1,6-diamino hexane in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol %. Further, according to some embodiments of the present invention, the amount of the repeating unit derived from 1,6-diamino hexane can be in a range from about any of the foregoing amounts to about any other of the foregoing amounts.

Examples of branched chain aliphatic diamine component units include without limitation 2-methyl-1,5-diamino pentane, 2-methyl-1,6-diamino hexane, 2-methyl-1,7-diamino heptane, 2-methyl-1,8-diamino octane, 2-methyl-1,9-diamino nonane, 2-methyl-1,10-diamino decane, 2-methyl-1,11-diaminoundecane, and the like, and combinations thereof. In exemplary embodiments, 2-methyl-1,5-diamino pentane, 2-methyl-1,7-diamino heptane, 2-methyl-1,8-diamino octane, and/or 2-methyl-1,9-diamino nonane can be used.

The polyamide resin (A) in accordance with the present invention can be prepared by methods known on the art, including the method disclosed herein. Also the polyamide resin is commercially available. For example, the polyamide resin can be prepared by a polycondensation reaction between dicarboxylic acid and diamine. For example, as described in WO 03/085029, the entire disclosure of which is incorporated by reference, a low order condensation product can be obtained by heating the dicarboxylic acid and diamine in the presence of a catalyst. After that, by giving shearing stress on the molten mass of this low order condensation product, the process of polycondensation is carried out.

The intrinsic viscosity [η] of polyamide resin (A) in accordance with the present invention measured in 96.5% sulfuric acid at 25° C. can be about 0.3 to about 0.9 [dl/g], for example about 0.5 to about 0.9 [dl/g], and as another example about 0.6 to about 0.9 [dl/g]. When the polyamide resin (A) has an intrinsic viscosity within this range, the fluidity of polyamide resin (A) can be excellent during the molding process.

In addition, polyamide (A) can have a melting point generally measured by DSC of about 260 to about 350° C., for example about 290 to about 335° C. A polyamide resin with a melting point within this range can have excellent heat resistance.

The polyamide resin composition includes the polyamide resin (A) in an amount of about 30 to about 80% by weight, based on 100% by weight (the total weight or amount) of polyamide resin (A), inorganic filler (B), and white pigment (C). In some embodiments, the polyamide resin composition can include the polyamide resin (A) in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the polyamide resin (A) may be present in an amount of from about any of the foregoing amounts to about any other of the foregoing amounts.

(B) Inorganic Fillers

An inorganic filler (B) added to the polyamide resin composition can improve the strength of polyamide resin (A). The polyamide resin composition of the present invention may comprise inorganic filler (B) in various forms. Examples of the shapes of the inorganic filler (B) include without limitation fiber shaped, powder shaped, particle shaped, plate shaped, needle shaped, cross shaped, mat shaped, and the like, and combinations thereof. Examples of the inorganic filler include without limitation glass fibers, metal coated glass fibers, ceramic fibers, carbon fibers, metallic carbide fibers, metallic cured fibers, asbestos fibers, boron fibers and the like, and combinations thereof.

In exemplary embodiments, a glass fiber can be used as a fiber filler. Using a glass fiber can improve the formability of the resin composition. In addition, mechanical properties such as tensile strength, flexural strength, and flexural modulus, heat resistance properties, such as thermal deformation temperature, and the like, of the product molded from the resin composition can improve.

The glass fiber can have a length of about 0.1 to about 20 mm, for example about 0.3 to about 6 mm.

The aspect ratio [L (average length of fiber)/D (average outer diameter of fiber)] can be about 10 to about 2000, for example about 30 to about 600.

The polyamide resin composition includes the inorganic filler (B) in an amount of about 10 to about 60% by weight, for example about 10 to about 40% by weight, and as another example about 10 to about 30% by weight, based on 100% by weight (the total weight or amount) of polyamide resin (A), inorganic filler (B), and white pigment (C). In some embodiments, the polyamide resin composition can include the inorganic filler (B) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60% by weight. Further, according to some embodiments of the present invention, the inorganic filler (B) may be present in an amount of from about any of the foregoing amounts to about any other of the foregoing amounts.

(C) White Pigment

Examples of white pigment (C) (which is not the same as inorganic filler (B) or inorganic fine particles (E) described herein) in accordance with the present invention include without limitation titanium oxide, zinc sulfide, lead white, zinc sulfate, aluminum oxide, and the like. These white pigments can be used either singly or in combination of more than two types thereof.

The white pigment can be surface treated with a coupling agent, such as a silane coupling agent and/or titanium coupling agent. For example, the white pigment can be surface treated with a silane compound such as vinyltriethoxysilane, 2-amino propyltriethoxy silane, and/or 2-glycidoxy propylethoxy silane.

In exemplary embodiments, the white pigment (C) includes titanium oxide. Using titanium oxide can improve the optical characteristics of reflectance (reflectivity) and hiding power.

In exemplary embodiments, the particle diameter of titanium oxide can be about 0.05 to about 2.0 μm, for example about 0.05 to about 0.7 μm.

The polyamide resin composition includes the white pigment (C) in an amount of about 5 to about 50% by weight, for example about 5 to about 40% by weight, and as another example about 5 to about 35% by weight, based on 100% by weight (the total weight or amount) of polyamide resin (A), inorganic filler (B), and white pigment (C). In some embodiments, the polyamide resin composition can include the white pigment (C) in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the white pigment (C) may be present in an amount of from about any of the foregoing amounts to about any other of the foregoing amounts.

(D) Photo Stabilizer

The polyamide resin composition in accordance with the present invention can minimize or restrict the reduction in the light reflectance (reflectivity) and can contain a photostabilizer (or light stabilizer). Examples of the photostabilizer include without limitation benzophenone compounds, salicylate compounds, benzotriazole compounds, acrylonitrile compounds, compounds which have UV absorption effects, hindered amine compounds, compounds which have radical catching capability such as hindered phenol compounds, and the like, and combinations of two or more of these. In exemplary embodiments, a compound with high solubility in the polyamide resin (A), excellent heat resistance, and which has an amide bond inside the molecule can be used.

The polyamide resin composition includes the photostabilizer (D) in an amount of about 0.05 to about 2 parts by weight, for example about 0.1 to about 2 parts by weight, based on about 100 parts by weight of the polyamide resin (A). In some embodiments, the polyamide resin composition can include the light stabilizer (D) in an amount of about 0.05, 0.06, 0.07, 0.08, 0.09, 0.1, 0.2, 0.3, 0.4, 0.5, 0.6, 0.7, 0.8, 0.9, 1, or 2 parts by weight. Further, according to some embodiments of the present invention, the light stabilizer (D) may be present in an amount of from about any of the foregoing amounts to about any other of the foregoing amounts.

The amount of photostabilizer (D) can be selected taking into account the desired prevention effect of color changes and reduction in the light reflectivity in the resin composition.

(E) Inorganic Fine Particles

The polyamide resin composition in accordance with the present invention includes inorganic fine particles that are different from inorganic filler (B) and white pigment (C) and that can have excellent adsorbability for the purpose of minimizing or restricting the reduction in the light reflectance (reflectivity). Examples of the inorganic fine particles include without limitation calcium carbonate, magnesium carbonate, zinc carbonate, zinc oxide, barium sulfate, zinc sulfide, alkali lead carbonate, titanated mica, antimony oxide, magnesium oxide, calcium phosphate, silica, alumina, mica, talc, kaolin, and the like, and combinations thereof.

The inorganic fine particles can have an average diameter of about 0.5 to about 7 μm. In some embodiments, the inorganic fine particles can have an average diameter of about 0.5, 0.6, 0.7, 0.8, 0.9, 1, 2, 3, 4, 5, 6, or 7 μm. Further, according to some embodiments of the present invention, the inorganic fine particles can have an average diameter from about any of the foregoing sizes to about any other of the foregoing sizes.

Inorganic fine particles enumerated as above in general can have an UV absorption effect. They also can have excellent radical capturing capabilities like adsorbability, and thus can restrict the increase in yellowness index when used in combination with the photostabilizer (D).

The polyamide resin composition includes the inorganic fine particles (E) in an amount of about 0.05 to about 3 parts by weight, for example about 0.05 to about 2 parts by weight, based on about 100 parts by weight of polyamide resin (A). In some embodiments, the polyamide resin composition can include the inorganic fine particles (E) in an amount of about 0.05, 0.06, 0.07, 0.08, 0.09, 0.1, 0.2, 0.3, 0.4, 0.5, 0.6, 0.7, 0.8, 0.9, 1, 2, or 3 parts by weight. Further, according to some embodiments of the present invention, the inorganic fine particles (E) may be present in an amount of from about any of the foregoing amounts to about any other of the foregoing amounts.

Also, the polyamide resin composition of the invention can include a photostabilizer (D) with inorganic fine particle (E) in a ratio about 1:2 to about 1:5. When the polyamide resin composition includes a photostabilizer (D) and inorganic fine particles (E) in amounts within this ratio, the polyamide composition can have excellent light reflectance (reflectivity) by restricting the reduction in the reflectivity. Also, the polyamide resin composition can have excellent heat stability and thus can exhibited reduced discoloration.

(E) Additives

In accordance with the present invention, the polyamide resin composition can optionally include one or more additives. The additives can be conventional additives so long as the additives do not hinder the effect of the invention.

Examples of the additives include without limitation antioxidants (phenols, amines, sulfur compounds, phosphorus compounds, and the like), heat stabilizers (lactone compounds, hydroquinone, halogenated copper, iodine compounds, and the like), flame retardants (bromine series, chlorine series, phosphorus series, antimony series, inorganic series, and the like), fluorescent brightening agents, plasticizers, thickeners, antistatic agents, release agents, pigments, nucleating agents, and the like, and combinations thereof.

In addition, olefins, modified polyolefins, olefin copolymers such as ethylene methylacrylate copolymer, ethylene ethylacrylate copolymer, ethylene propylene copolymer, ethylene-1-butene copolymer, propylene-1-butene copolymer, and the like, polystyrene, fluoride resins, silicon resins, liquid crystalline polymers (LCPs), and the like, and combinations thereof can be also optionally be added.

The skilled artisan can readily select the types and amounts of additives without undue experimentation depending on the use of the compositions and the desired additional properties thereof.

A polyamide resin composition in accordance with the present invention can be prepared with the above components using conventional methods, for example mixing with a Herschel mixer, V blender, ribbon blender, and/or tumbler blender, and the like, or mixing and then melting and kneading with a single screw extruder, multi-screw extruder, kneader, and/or Banbury mixer, and the like, and then molding the composition.

A polyamide resin composition prepared by using the types and amounts of components described herein can have excellent light reflectance (reflectivity), heat resistance, and/or adhesion used with a sealing resin such as epoxy resin. At the same time, the polyamide resin composition of the invention can restrict or minimize reduction in the reflectance (reflectivity) when it is used as a reflecting plate of LED operating elements, thus it can be used as a reflecting plate.

In addition, a reflecting plate for LED elements can be made into the desired shape by thermo forming processes, such as injection molding (insert molding of metal such as hoop molding), melting, extrusion, inflation, molding, and/or blow molding of resin composition as known on the art for molding a polyamide resin, or resin composition comprising polyamide resin and inorganic fillers. In accordance with the present invention, the LED reflecting plate can be sealed, joined, and bonded by LED elements, other parts, and sealing resin using conventional techniques known in the art.

In addition, the polyamide resin composition in accordance with the present invention can be applied not only on LEDs, but also on other applications for reflecting light. For example, it can be used as a reflecting plate for light emitting devices such as various electrical and electronic parts, indoor lights, ceiling luminaries, outdoor lights, car lights, display devices, headlights, and the like.

Further, a reflecting plate in accordance with the present invention can be manufactured by heating the polyamide resin intended for a reflecting plate, molding using a desired mold, and then cooling. In particular, a reflecting plate can be manufactured by the method disclosed, such as an injection molding process, compression molding process, and extrusion molding process.

The present invention not only provides a polyamide resin composition having an excellent reflectance (reflectivity) and heat resistance but also provides molded products. An example of a molded product is a reflecting plate or reflecting plate for light emitting diode elements. The reflecting plate or reflecting plate for light emitting diode can have a reflectance (reflectivity) of about 70 to about 100%, for example about 80 to about 90%, and as another example higher than about 85% and a yellowness index of about 1 to about 10, for example about 1 to about 5, and as another example less than about 5, when the reflectance (reflectivity) and yellowness index are measured using a LED light source (maximum wavelength 460 nm) after irradiation for 120 hours.

The invention may be better understood by reference to the following examples which are intended for the purpose of illustration and are not to be construed as in any way limiting the scope of the present invention, which is defined in the claims appended hereto.

EXAMPLES

The specifications of each component used in the examples and the comparative examples in accordance with the present invention are as given below.

(A) Polyamide

The polyamide resin used in accordance with the present invention is C3200 from Mitsui Chemical (JAPAN), the intrinsic viscosity [η] of which measured at 25° C. in the 96.5% sulfuric acid is 0.6 [dl/g] and melting point measured with DSC is 320° C.

(B) Inorganic Filler

Inorganic filler from CS910 from OCV Reinforcements (USA) is used.

(C) White Pigment $TiO_2$ 2233 from KRONOS (USA) is used.

(D) Photo Stabilizer

S-EED from Clariant (JAPAN) is used.

(E) Inorganic Fine Particle

STARMAG 150 from Zhongding (CHINA) is used.

Examples 1 to 4 and Comparative Examples 1 to 5

Each compositional element, antioxidants, heat stabilizers, and release agents are added and mixed with a conventional mixing machine and extruded using a twin extruder of L/D=35, φ=45 mm. The extruded mass is prepared into a pellet form and test specimens with a plate shape (length 90 mm, width 49 mm, and thickness 2.5 mm) are prepared at an injection molding temperature between 320° C. to 340° C. using a 10oz injection molding machine. These specimens are left at a temperature of 23° C. and at a relative humidity (R.H.) of 50% for 48 hours and then the physical properties are measured in accordance with ASTM specifications.

[Reflectance]

The reflectance (reflectivity) of a specimen having a length 90 mm, width 49 mm, and thickness 2.5 mm prepared by injection molding is measured at a wavelength of 440 nm. The initial reflectance (reflectivity) is measured and then after light irradiation for 120 hours using a LED light source of wavelength 460 nm, the reflectance (reflectivity) is measured inside a thermohygroscopic oven in which the temperature and relative humidity (R.H.) are maintained at 85° C. and 85% respectively. The reflectance (reflectivity) is evaluated as follows: O =more than 85%; and X =below 85%. The injection molding equipment used for the test is from JSW (Co. Ltd.) (Cylinder temperature 335° C., mold temperature 130° C.) and the reflectance (reflectivity) measuring equipment is CM3500d from KONICA MINOLTA HOLDINGS, INC.

[Yellow Index]

Yellowness index of 2.5 t color chip specimen is measured using a color difference meter from Minolta 3600D CIE Lab in accordance with ASTM D1925.

[Evaluation of Peel Off]

A cup shaped formed product with a length 3 mm, width 2.5 mm, and height 2 mm is hoop molded. At the contact portion of hoop materials and cup shaped formed product, water soluble ink is poured to examine the intrusion of ink into the contact surface between the cup shaped molded product and hoop materials by the capillary phenomenon. The intrusion of ink is evaluated as follows: O: no permeation; and X: permeated.

TABLE 1

|  |  | Example |  |  |  | Comparative Example |  |  |  |  |
| --- | --- | --- | --- | --- | --- | --- | --- | --- | --- | --- |
|  |  | 1 | 2 | 3 | 4 | 1 | 2 | 3 | 4 | 5 |
| (A)Polyamide (% by weight) |  | 60 | 60 | 60 | 60 | 60 | 60 | 50 | 60 | 40 |
| (B)Inorganic filler (% by weight) |  | 20 | 15 | 20 | 20 | 15 | 15 | 15 | 10 | 40 |
| (C)White pigment (% by weight) |  | 30 | 25 | 30 | 30 | 25 | 25 | 35 | 30 | 20 |
| (D)Photostabilizer (parts by weight) |  | 0.05 | 0.5 | 1 | 1.5 | 4 | 0.5 | — | 5 | — |
| (E) Inorganic fine particles (parts by weight) |  | 0.2 | 1 | 0.5 | 3.0 | 5 | — | 1 | — | 15 |
| Reflectance (Reflectivity) (%) | Initial reflectance (reflectivity) | 89 | 89 | 88 | 88 | 88 | 88 | 89 | 88 | 75 |
|  | After 120 hours | 84 | 87 | 86 | 86 | 75 | 65 | 72 | 85 | 55 |
| Peel off |  | O | O | O | O | Δ | O | O | O | X |
| Yellowness Index | Initial Yellowness Index | 2.1 | 2.5 | 2.6 | 2.4 | 5.6 | 3.0 | 5.0 | 9.8 | 7.0 |
|  | After 120 hours | 3.1 | 2.8 | 2.9 | 3.2 | 20.4 | 12.4 | 10.8 | 25.8 | 15.4 |

Method of Measurement of the Physical Properties

[Intrinsic Viscosity (η)]

0.5 g of polyamide resin is dissolved into 50 ml of 96.5% sulfuric acid, and the number of seconds of sample solution dropping is measured using a Ubbelohde viscometer at 25° C.±0.05° C. The intrinsic viscosity is then estimated using the following equation.

$$[\eta]=\eta SP/[C(1+0.205\eta SP], \eta SP=(t-t0)/t0$$

[η]: Intrinsic viscosity (dl/g), ηSP: Specific viscosity, C: Sample concentration (g/dl), t: number of second of sample solution dropping (second), t0: number of second of blank sulfuric acid (second)

[Melting Point]

The temperature is maintained at 330° C. for five minutes using DSC7 from PerkinElemer and then the temperature is reduced to 23° C. with a speed of 10° C./min. and then it is again increased with a speed of 10° C./min. The endothermic peak is set as the melting point based on the melting during the changes in temperature.

As shown in the above Table 1, examples 1 to 4 have a reflectance (reflectivity) maintained at more than 85% even after of the passage of 120 hours under a LED light source with a wavelength of 460 nm inside the thermo hygroscopic oven kept at a temperature of 85° C. and R.H. of 85%. In contrast, reflectance (reflectivity) is significantly reduced when only a photostabilizer is used (comparative example 2) and only inorganic fine particles are used (comparative examples 3 and 5). In the case where both the photostabilizer and inorganic fine particles are used (comparative example 1), if the amounts thereof are outside of the range in accordance with the present invention, the reflectance (reflectivity) is reduced and yellowness index also significantly increases.

In particular, comparative example 2 includes a only a photostabilizer. The light and heat by light irradiation decompose the polyamide resin, and the activated component which increases the yellowness index generated by the decomposition of polyamide is not completely removed. As a result, the yellowness index significantly increases while reflectance (reflectivity) is reduced (decreases). In the meanwhile, in contrast to comparative example 2, when the photostabilizer is used in an amount greater than the present invention, such as in comparative example 4, the excess photostabilizer itself decomposes, which increases the initial yellowness index as well as significantly increases the final yellowness index.

When both inorganic fine particles and photostabilizer are included, but in amounts outside the present invention (comparative example 1), the initial yellowness index and final yellowness index after 120 hours under a LED light source with a wavelength of 460 nm inside the thermo hygroscopic oven under a temperature of 85° C. and RH of 85% are increased. Once the yellowness index is increased by the light which is generated while irradiating with the incident LED light source, the absorptivity of the reflecting plate is increased. This process results in reduction in the efficiency of the LED light source.

In addition, when the product molded using a polyamide resin composition in accordance with the present invention is processed by an injection molding process, the releasing defect or peeling off caused by mixing different resins is examined. The result of this examination shows that when inorganic fine particles are used in excess (comparative example 5), the water soluble ink permeated during the examination of the peeling off.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A polyamide resin composition comprising:
    (A) a polyamide resin in an amount of about 30 to about 80% by weight,
    (B) fiber shaped inorganic filler comprising glass fibers, metal coated glass fibers, ceramic fibers, carbon fibers, metallic carbide fibers, metallic cured fibers, asbestos fibers, boron fibers or a combination thereof in an amount of about 10 to about 60% by weight,
    (C) white pigment in an amount of about 5 to about 50% by weight, wherein the white pigment (C) comprises titanium oxide, zinc sulfide, lead white, zinc sulfate, aluminum oxide, or a combination thereof; and
    (D) photostabilizer in an amount of about 0.05 to about 2 parts by weight and (E) inorganic particles comprising calcium carbonate, magnesium carbonate, zinc carbonate, zinc oxide, barium sulfate, alkali lead carbonate, titanated mica, antimony oxide, magnesium oxide, calcium phosphate, silica, mica, talc, kaolin or a combination thereof in an amount of about 0.05 to about 3 parts by weight, wherein each of (D) and (E) is based on about 100 parts by weight of the polyamide resin (A),
    wherein photostabilizer (D) and inorganic particles (E) are included in a ratio of about 1:2 to about 1:5.

2. The polyamide resin composition of claim 1, wherein polyamide resin (A) has an intrinsic viscosity [η] from about 0.6 to about 0.9 [dl/g] measured in 96.5% sulfuric acid at 25° C.

3. The polyamide resin composition of claim 1, wherein the melting point of the polyamide resin (A) is more than about 310° C.

4. The polyamide resin composition of claim 1, wherein the fiber shaped inorganic filler (B) includes a glass fiber with an average length of about 0.1 to about 20 mm and an aspect ratio of about 10 to about 2000.

5. The polyamide resin composition of claim 1, wherein photostabilizer (D) has a hindered amine structure.

6. The polyamide resin composition of claim 1, wherein inorganic particles (E) comprise magnesium oxide.

7. A molded product by using the polyamide resin composition of claim 1.

8. The polyamide resin composition of claim 1, having a reflectivity of greater than about 80% after exposure to a LED light source with a wavelength of 460 nm for 120 hours and a yellow index of less than about 5 after exposure to a LED light source with a wavelength of 460 nm for 120 hours.

9. The polyamide resin composition of claim 1, wherein the fiber shaped inorganic filler (B) comprises glass fiber; the white pigment (C) comprises titanium oxide; the photostabilizer (D) has a hindered amine structure; and the inorganic particles (E) comprise magnesium oxide.

\* \* \* \* \*